United States

Miles

[15] 3,658,415

[45] Apr. 25, 1972

[54] OFF AXIS LOW VOLUME MICROFORM PROJECTOR

[72] Inventor: John R. Miles, Glenview, Ill.

[73] Assignee: Microdisplay Systems, Inc., New York, N.Y.

[22] Filed: Sept. 14, 1970

[21] Appl. No.: 71,658

[52] U.S. Cl. ................... 353/78, 350/202, 352/242, 353/74, 353/122
[51] Int. Cl. .......................... G03b 21/22, G03b 21/28
[58] Field of Search ............ 353/69, 70, 74, 77, 78, 79, 353/122; 352/242; 350/202

[56] References Cited

UNITED STATES PATENTS

| | | |
|---|---|---|
| 1,454,691 | 5/1923 | Riddell et al. ............................ 353/2 |
| 1,975,302 | 10/1934 | Van Albada ............................ 350/202 |
| 3,399,014 | 8/1968 | Butterfield et al. ..................... 350/202 |

*Primary Examiner*—Leonard Forman
*Assistant Examiner*—Steven L. Stephan
*Attorney*—Albert F. Kronman

[57] ABSTRACT

A compact film projector in which a wide angle lens is used for focusing the object on a screen, but considerably less than all of the available wide angle lens field is used. The cubic volume of the system is greatly reduced by discarding a portion of the field. A reflecting prism incorporated in the lens assembly and a reflecting mirror as a part of the condensing lens system make the projector even more compact.

4 Claims, 4 Drawing Figures

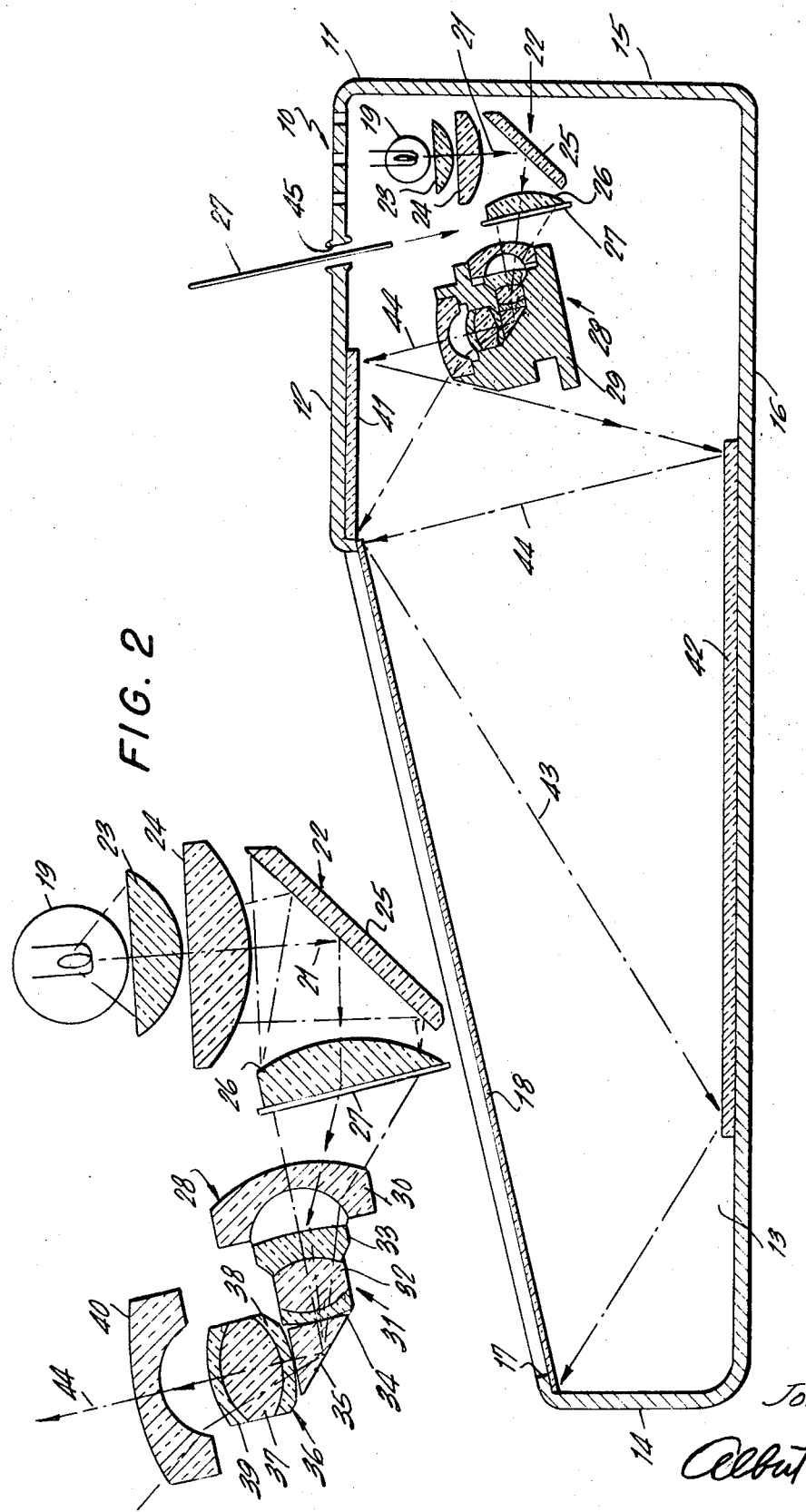

INVENTOR.
JOHN R. MILES.

ATTORNEY

3,658,415

OFF AXIS LOW VOLUME MICROFORM PROJECTOR

BACKGROUND OF THE DISCLOSURE

The need for small portable film projectors is increasing as more data is being stored in microform and similar small photographic areas. Known projectors which magnify such films are bulky, require a substantial supporting means, take up considerable floor or desk space and cannot be hand held comfortably. It is an object of this invention to provide a small, light, portable projector which can be hand held or used as a desk top device with sufficient screen size for easy reading. In order to more efficiently and further reduce the volume of the system, mirrors which fold the light path into a small space together with a wide angle lens are used and the light directed through only a portion of the lens field.

One of the features of the present invention is the use of a reflecting prism in the lens system to reduce volume and to make the shape of the unit more practical.

Another feature of the present invention is the compact, low height design made possible by the multiple reflecting surfaces within the device and the use of off axis projection.

For a better understanding of the present invention, together with other details and features thereof, reference is made to the following description taken in connection with the accompanying drawings.

BRIEF DESCRIPTION OF THE FIGURES

FIG. 1 is a cross sectional view of one embodiment of the invention showing the relative positions of the optical components.

FIG. 2 is a cross sectional view of the wide angle lens and optical assembly shown in FIG. 1, somewhat enlarged.

DESCRIPTION OF THE PREFERRED EMBODIMENT

Figure 3:
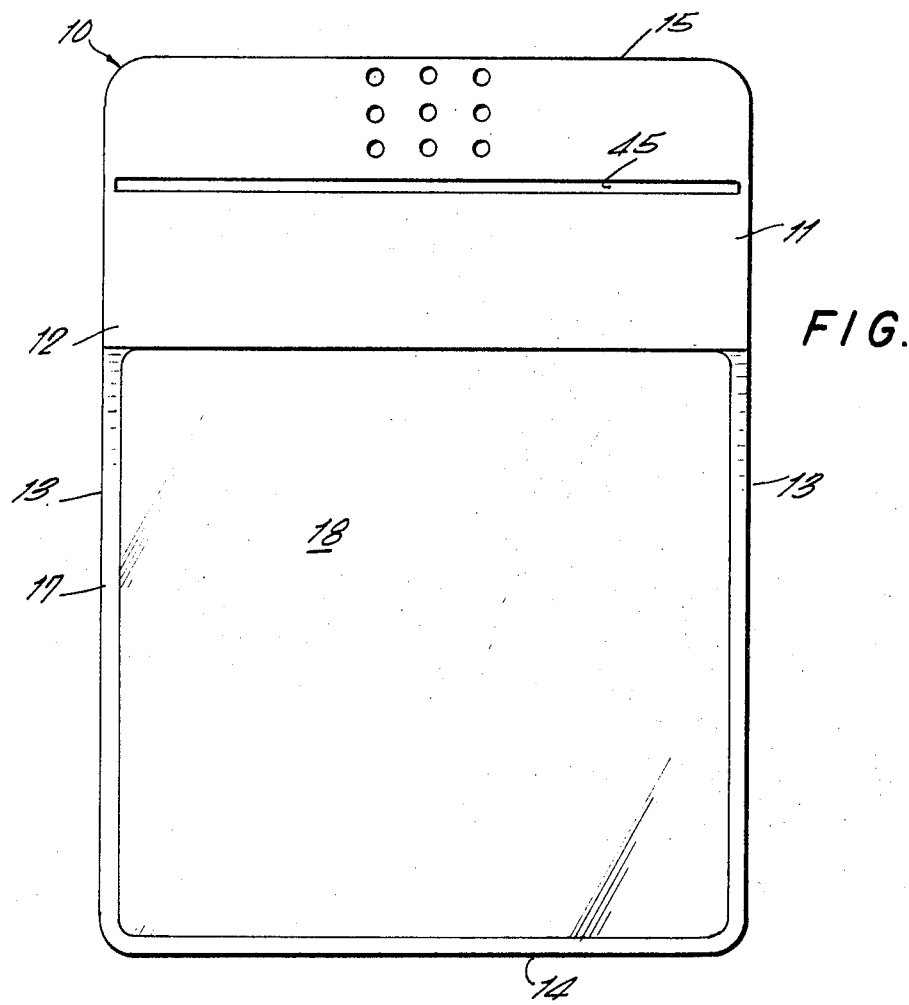
FIG. 3 is a plan view of the projector of FIG. 1.

Referring to the Figures and particularly to FIG. 1, 10 indicates a film projection device, having a housing 11 made of plastic, metal or some other suitable rigid material. The housing 11 consists of a hollow enclosure having a top 12 spaced sides 13, a front 14, a rear wall 15 and a bottom portion 16. An inclined panel 17 on the housing top 12 is provided with a viewing screen 18 made of some translucent material well known in the rear projection art.

The housing 11 encloses a light source indicated at 19 which is carried adjacent the rear wall 15. Light from the light source 19 indicated by arrows 21 is directed through a condenser assembly 22, consisting of a first lens 23, a second lens 24, a mirror 25, and a third condenser lens 26.

The condenser lens assembly 22 serves to evenly illuminate a film 27, which is to be projected. The film 27 referred to herein may be, for example, microform, motion picture, etc.

Light from the condenser assembly 22 is directed by the mirror 25 into a projection lens assembly 28. The projection lens assembly 28 is rigidly supported by a block 29 secured to the housing sides 13. As best shown in FIG. 2, illustrating one particular embodiment, the projection lens assembly 28 consists of a wide angle lens system and includes a first negative lens 30 of flint glass, a first cemented triplet 31, having a central positive lens 32 of light flint and two negative lenses 33, 34, formed of crown and heavy flint glass respectively. A reflecting prism 35 is disposed at the exit face of the triplet 31 and is adapted to direct light entering the said prism at right angles to its original axis. A second cemented triplet 36 is included in the wide angle lens assembly 28 and consists of a central positive lens 37 of light crown glass between two negative lenses 38, 39, of light flint glass. The last lens element 40 in the wide angle lens assembly 28 is a negative lens of flint glass.

The film or transparency 27 is inserted in the device through an opening in the housing 11 such as is shown at 45.

As will be apparent from an examination of FIGS. 1 and 2, light directed through the film or transparency 27 enters principally the bottom half of the first negative lens 30 of the wide angle lens system 28. The importance of this off axis projection will become apparent from an examination of FIGS. 2 and 4 from the standpoint of maintaining an extremely compact low volume projection system. Light is directed upwardly by reason of the prism 35 through the remainder of the wide angle projection lens 28 and on to an upper mirror 41 secured to the top 12 of the housing 11.

The upper mirror 41 directs the light incident thereon to a bottom mirror 42 secured to the bottom of the housing 11. Light from the bottom mirror 42 is directed to the inner face of the screen 18 to provide a visible image on the outer face thereof. The path of the light through the optical system can be traced by the dashed lines 43.

As will be apparent from FIGS. 1 and 2, the wide angle projection lens 28 is used to focus off-axis rays of light with its optical axis 44 intersecting the viewing screen 18 at its upper edge. The optical axis 44 of the lens 28 is perpendicular to the screen 18 and to the object to be projected.

Figure 4:
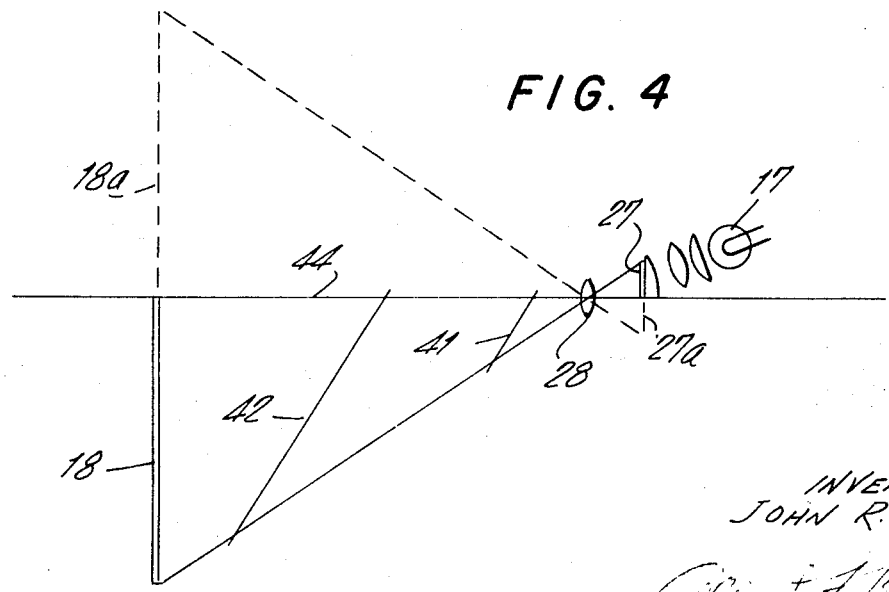
FIG. 4 is a somewhat diagrammatic development of the lens field system showing the object, the image screen and the mirror positions.

The diagram shown in FIG. 4 shows the lens 28 on the optical axis 44 and perpendicular to it. On one side the object or film 27 is also perpendicular to the axis 44, but intersecting it at its lower edge only. The viewing screen (image) 18 is perpendicular to the axis 44, but intersects it only at its upper edge. The position of the mirrors 41, 42, is indicated by lines 41 and 42. The wide angle lens 28 if used in its entirety is capable of focusing the rays from an object 27 plus 27a onto a screen 18 plus 18a. By reason of the off-axis projection (not more than 60 percent of the field of the lends 28 is used) a compact low volume optical system is achieved, which can be folded by the mirrors to provide a relatively large viewing area within a very small area.

In the above description, in the interest of clarity, many of the supporting brackets and adjusting means have been omitted. Such supports are well known in the art and are felt to be unnecessary in the present description. The specific radii number and shape of the various lens elements are also capable of a wide variety of specification without departing from the spirit of the present invention. In addition, it will be obvious to those skilled in the art that condensers employing more or fewer lens elements, than shown may be used.

Having thus fully described the invention, what is claimed as new and desired to be secured by Letters Patents of the United States, is:

1. A compact transparent medium projecting device comprising a hollow housing having an apertured top, a bottom, spaced side walls and a front and back wall, a translucent screen member carried in the housing top aperture, a light source, a condenser to receive light from the light source and direct it through a transparent medium, a wide angle projection lens assembly having an axis and positioned to receive off-axis and substantially on one side of the axis light passing through the transparent medium, a prism within the projection lens assembly to change the direction of light path entering the said projection lens, a top mirror within the housing to receive the light coming from the projection lens, a bottom mirror to receive the light reflected from the top mirror and direct it upon the inner surface of the screen member.

2. A device according to claim 1 in which the prism is a totally reflecting prism and not more than 60 percent of the field of the wide angle projection lens is used.

3. A device according to claim 1 in which the condenser includes a plane mirror.

4. A device according to claim 1 in which the apertured portion of the housing top is inclined at an angle to receive the light coming from the bottom mirror.

* * * * *